United States Patent [19]
Stein

[11] 3,805,350
[45] Apr. 23, 1974

[54] CUTOFF INSERT APPARATUS
[75] Inventor: William B. Stein, Barberton, Ohio
[73] Assignee: The Warner & Swasey Company, Cleveland, Ohio
[22] Filed: Nov. 29, 1972
[21] Appl. No.: 310,353

[52] U.S. Cl. .................................. 29/95 R, 29/96
[51] Int. Cl. ............................................ B26d 1/00
[58] Field of Search ................................. 29/95, 96

[56] References Cited
UNITED STATES PATENTS
3,653,107  4/1972  Hertel ............................... 29/95 R
936,793  10/1909  Middleton ......................... 29/95 R

*Primary Examiner*—Leonidas Vlachos
*Attorney, Agent, or Firm*—Freeman & Taylor

[57] ABSTRACT

An improved metal cutoff apparatus that is characterized by the provision of an improved insert having added stability against lateral shifting and toppling and an improved support blade adapted to receive the same in supported relationship for cutoff purposes. The insert is characterized by being of generally relatively blade-like configuration throughout a substantial portion of its length from its cutting edge rearwardly, with the rear portion thereof being transversely widened and with the entire insert having a V-shaped bottom support surface. The top surface of the support blade is appropriately contoured in width to receive the same.

3 Claims, 8 Drawing Figures

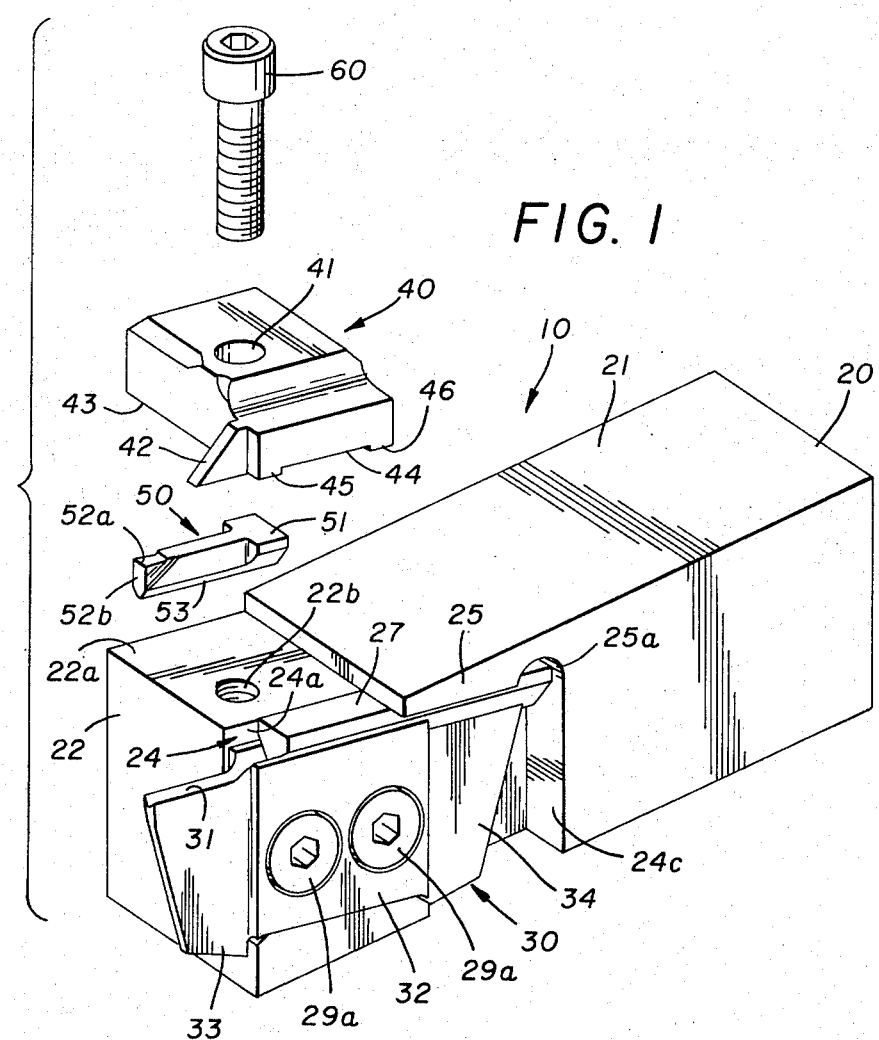
FIG. 1
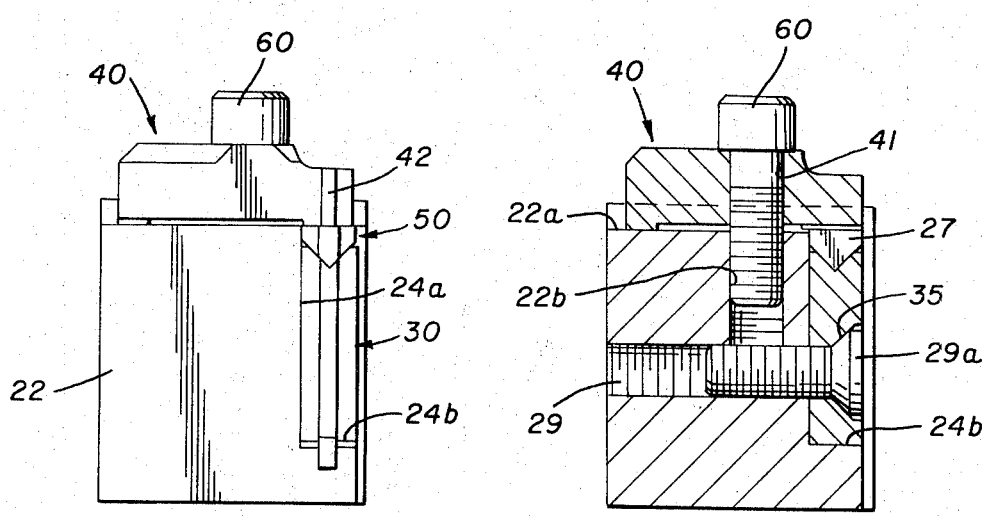
FIG. 2
FIG. 5

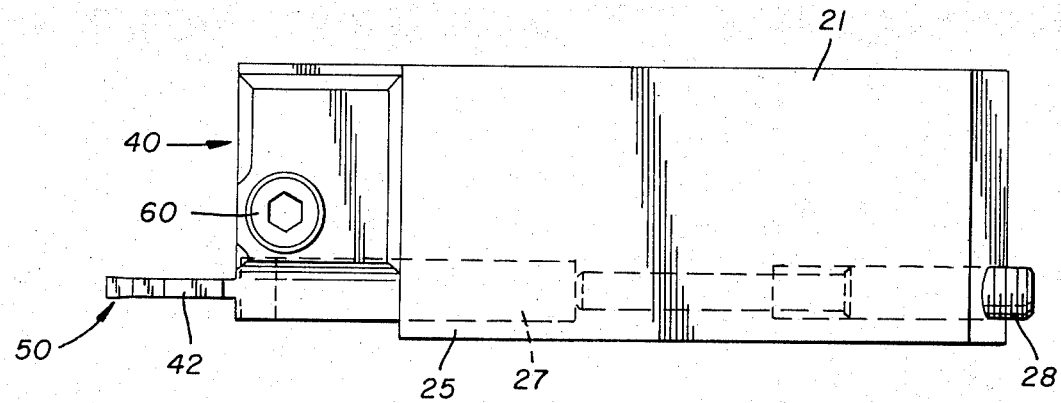
FIG. 3
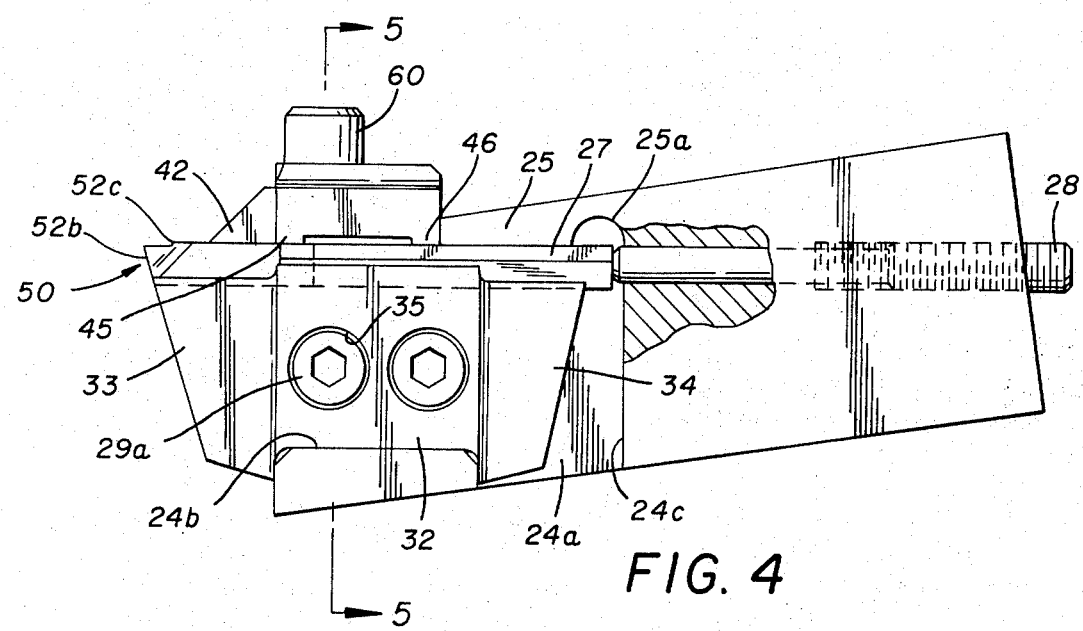
FIG. 4
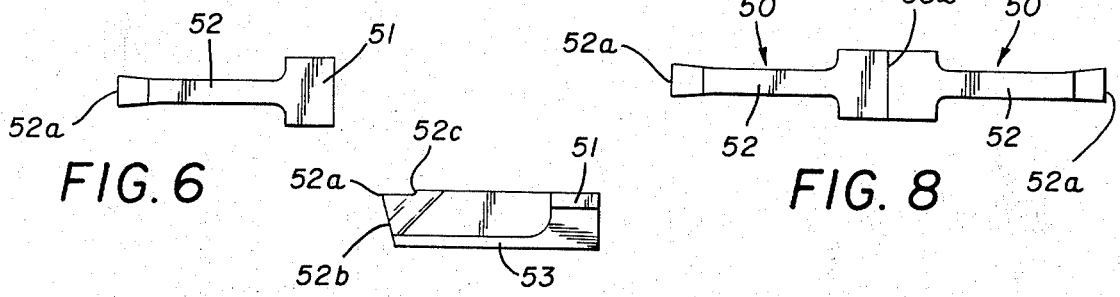
FIG. 6
FIG. 7
FIG. 8

CUTOFF INSERT APPARATUS

BACKGROUND OF THE INVENTION

In the field of metal cutoff it has long been known that best results can be obtained by utilizing a blade-like structure to effectuate the cutoff of a revolving metal part.

Since the material cut off is, in effect, wasted, it is axiomatic that the narrower the cut at the point of cutoff, the more parts per unit can be obtained to thus reduce the cost of cutoff. Practical considerations, however, have heretofore limited the narrowness of cut simply because if the cutoff tool is made too thin or narrow, it does not present either sufficient clamping or support surfaces while providing sufficient stock for adequate clearance angles to enable it to be held firmly, and thus it is incapable of effectively cutting off the metal without vibration which results in a loss of accuracy.

DESCRIPTION OF THE PRIOR ART

The most pertinent prior art patents are believed to be the following U.S. Patents:

| | |
|---|---|
| Novkov | U.S. Patent 2,737,705 |
| Novkov | U.S. Patent 2,846,756 |
| Novkov | U.S. Patent 2,897,579 |
| Novkov | U.S. Patent 2,964,833 |
| Stein | U.S. Patent 3,125,798 |
| Emmons | U.S. Patent 3,163,918 |
| Davis | U.S. Patent 3,371,567 |
| Miller | U.S. Patent 3,455,002 |
| Cochran | U.S. Patent 3,611,525 |
| Cochran | U.S. Patent 3,686,729 |

There are, of course, numerous other prior art cutoff tools, but none are believed to disclose the uniquely configured and dimensioned insert disclosed herein which provides an extremely narrow cut with a high degree of stability and holding capabilities.

SUMMARY OF THE INVENTION

It has been discovered that the dual objectives of providing an extremely narrow cutting insert and thereby an extremely narrow cut while providing means for securely clamping and holding the insert can be achieved by providing an insert having a unique configuration and dimensional correlation.

Thus it has been discovered that the desired narrowness of cut can be provided by having an elongate, narrow cutting portion of blade-like configuration terminating in an enlarged rear base portion.

It has been found that by providing an insert of this configuration, the thin cutting portion achieves the cutoff objective with a minimum waste of stock, while the enlarged rear portion provides a clamping surface which enables the insert to be securely clamped to resist the normal forces encountered during cutoff and thereby improve the cutting action and minimize the possibility of damage to the tool.

Production of an improved cutoff tool having an improved insert accordingly becomes the principal object of this invention, with other objects of the invention becoming more apparent upon a reading of the following brief specification, considered and interpreted in view of the accompanying drawings.

OF THE DRAWINGS

FIG. 1 is an exploded perspective view of the improved cutoff apparatus.

FIG. 2 is a front elevation thereof.

FIG. 3 is a top plan view.

FIG. 4 is a side elevational view partially broken away.

FIG. 5 is a sectional view taken on the line 5—5 of FIG. 4.

FIG. 6 is a top plan view of the insert per se.

FIG. 7 is a side elevational view of the insert of FIG. 6.

FIG. 8 is a top plan view of a modified form of insert.

DESCRIPTION OF THE PREFERRED EMBODIMENTS

Referring now to the drawings and in particular to FIG. 1, the improved cutoff apparatus, generally designated by the numeral 10, includes a tool body 20, a support blade 30, a clamping member 40, and an insert 50, with the arrangement being such that during use, the insert 50 will be clamped on to the front V-shaped edge 31 of the support blade 30 by the clamping member 40 when the same is drawn in place by the bolt 60. This assembled condition can be best seen in FIGS. 2 through 5 of the drawings.

While the tool body 20 may be of any configuration desired, the same normally includes a base portion 21 and a forward portion 22, with the base portion 21 being designed to be clamped in the usual tool clamping apparatus of a machine tool so that the forward end 22 may receive the appropriate cutoff components that project there beyond for cutoff purposes in known fashion.

To this end, an offset pocket 24 is provided in forward portion 22 for reception of the support blade 30, with the pocket 24 being formed by a vertical wall 24a, a bottom wall 24b, and a rear wall 24c (see FIGS. 1 and 4).

The pocket 24 just described is partially closed by an overhanging lip 25 of base portion 21 that serves to provide a point of support for the backup member 27 that is releasably seated upon the upper V-shaped edge 31 of the support blade 30. This backup member 27 is shiftable longitudinally by the backup screw 28 that is best shown in FIGS. 3 and 4 of the drawings.

A relieved area 25a (see FIGS. 1 and 4) is provided on the lowermost portion of the member 25 for clearance purposes, with FIG. 4 illustrating that a friction type fit is provided between the bottom surface of the overhanging lip 25 and the upper surface of the backup member 27 so as to permit free shifting of this member along the surface 31 for adjustment purposes.

In addition to the aforementioned component parts, the forward portion 22 of the body includes two tapped apertures 29,29 within which threaded bolts 29a,29a may be received, as best shown in FIG. 5 of the drawings. Additionally, the top surface 22a of forward portion 22 (see FIG. 1) is provided with a threaded aperture 22b within which the bolt 60 may be received.

Turning now to the construction of the support blade 30, the same is shown as preferably being symmetrical about its midpoint so as to be reversible insofar as attachment to the tool body is concerned.

Thus the support blade includes a central portion 32 and projecting end portions 33 and 34, with the center portion 32 being approximately double the thickness of the end portions 33 and 34 and with it being noted that the V-shaped surface 31 provided on the top portion thereof is adapted to support both the backup member 27 and the insert 50 as will presently be described.

Countersunk openings 35,35 are provided in the center portion 32 of support blade 30 for reception of the threaded bolts 29a,29a as shown in FIG. 5 of the drawings, and in this way blade 30 may be releasably secured to tool body 20 partially within pocket 24.

The clamping member 40 is generally of block-like configuration and includes a through opening 41 through which the bolt 60 may be passed for reception into the threaded opening 22b. A clamping arm 42 projects forwardly of the body portion of the member 40 so as to overlie the insert 50 when the same is seated upon the V-shaped groove 31 of the support blade. The lower surface 43 of the clamping member 40 is undercut as at 44 to define localized bearing areas 45 and 46, with the localized bearing area 45 bearing on the insert 50 while the localized area 46 bears upon the backup member 27.

Turning now to FIGS. 1 and 6 for a detailed description of the insert 50, it will first be noted that the same is somewhat T-shaped in configuration when viewed in plan, as in FIG. 6, and with it being noted that the insert 50 includes a rear base portion 51, a cutting portion 52, and a coextensive V-shaped bottom 53 that extends longitudinally the length of the insert 50 and with this V-shaped bottom 53 being adapted to be received on the V groove 31 of the support blade 30.

It will also be noted from FIG. 6 that the cutting portion 52 flares outwardly to define a cutting edge 52a with appropriate clearance being ground thereon as at 52b, and with it further being noted that the width of the rear base portion 51, as viewed in plan in FIG. 6, is approximately twice the width of the cutting portion 52. A chip-breaking ledge 52c may also be provided adjacent cutting edge 52a.

Further, in viewing the insert 50 in the elevation shown in FIG. 7, it will be noted that the longitudinal length of the cutting portion 52 is a substantial multiple of that of the base portion 51, with the width of the base portion 51 serving to provide a greater clamping surface upon which the clamping arm 42 and bearing area 45 may operate to thus increase the stability of the cutting tool. This increased width also provides increased seating surfaces on the V-shaped bottom.

Also it should be noted that the width of cutting portion 52 is preferably no more than 75 percent of the height thereof, with the same relative dimensions being present with respect to the base portion 51.

In use or operation of the improved cutoff tool, it will first be assumed that the parts have been manufactured to the form shown herein, and at this point it is merely necessary that the support blade be secured within pocket 24 of the frontal portion 22 of the tool body 20 by positioning bolts 29a,29a and drawing the same into place. When this has been done, the backup or stop member 27 may be inserted as shown in FIG. 1, followed by seating of the insert 50 on the V-shaped groove 31 of the support blade 30.

When this has been accomplished, it is merely necessary to position the clamp 40 in place, insert the bolt 60, and draw the same down tightly so as to clamp the insert between the support blade and the clamping arm.

In the event the insert is not projecting properly beyond the support blade to the condition shown in FIG. 4, it is merely necessary that the bolt 60 be slightly backed off to loosen the clamping arm, at which time the screw 28 may be rotated to either advance or retract the member 27 and the insert 50 to the extent required.

In FIG. 8, there is shown a modified form of the invention which merely consists of two inserts 50,50 being placed together along the line 53a, with it being also understood that this modified insert shown in FIG. 8 can be made of one piece if so desired.

In instances of use of this type of double-ended insert, it would, of course, be necessary to modify the backup or stop member 27 so that the forward face thereof would be complemental to the forward edge 50a (see FIG. 7) of the insert 50.

It is also possible to make the insert of FIG. 6 of two pieces by joining cutting portion 52 to base portion 51 by brazing or other suitable means.

It will be seen from the foregoing that there has been provided a new and improved type of cutting insert that is characterized by an extremely thin cutting portion that is stabilized by a wider base portion from which the same projects.

Because of this construction, minimum width of cut is achievable without loss of stability. It will also be noted how there has been provided a new and improved type of support blade that is adapted to receive this improved insert, with the blade being reversible and yet adapted to receive inserts and stop members of varying widths.

While a full and complete description of the invention has been set forth in accordance with the dictates of the Patent Statutes, it is to be understood that the invention is not intended to be limited to the specific embodiments herein shown.

Accordingly, modifications of the invention may be resorted to without departing from the spirit hereof or the scope of the appended claims.

What is claimed is:

1. An elongated cutting insert of the character described, comprising;
    A. a base portion having
        1. a length dimension and a height dimension,
        2. a top surface having a width dimension,
        3. a V-shaped bottom surface, and
        4. opposed side surfaces symmetrical with respect to said V-shaped bottom surface;
    B. a cutting portion projecting coextensively from said base portion and having
        1. a length dimension and a height dimension,
        2. a top surface having a width dimension,
        3. a V-shaped bottom surface that is coplanar with the V-shaped bottom surface of said base portion,
        4. opposed side surfaces, and
        5. a cutting edge extending transversely across said top surface at the projecting end thereof;
    C. the width dimension of said base portion being approximately double the width dimension of said cutting portion;
    D. the heigh dimensions of said base and said cutting portions being substantially identical;
    E. said side surfaces of said base portion being symmetrically offset in parallel relationship to said side surfaces of said cutting portion; and
    F. the length dimension of said cutting portion being a substantial multiple of the length dimension of said base portion.

2. The insert of claim 1 wherein the top surfaces of said base portion and said cutting portion are coplanar.

3. An elongated cutting insert, comprising;
A. a base portion having
   1. a length dimension and a height dimension,
   2. a top surface having a width dimension,
   3. a V-shaped bottom surface, and
   4. opposed side surfaces symmetrical with respect to said V-shaped bottom surface;
B. opposed cutting portions projecting co-extensively from opposed ends of said base portion and each having
   1. a length dimension and a height dimension,
   2. a top surface having a width dimension,
   3. a V-shaped bottom surface that is coplanar with the V-shaped bottom surface of said base portion,
   4. opposed side surfaces, and
   5. a cutting edge extending transversely across said top surface at the projecting end thereof;
C. the width dimension of said base portion being approximately double the width dimensions of said opposed cutting portions;
D. the height dimensions of said base portion and said opposed cutting portions being substantially identical;
E. said side surfaces of said base portion being symmetrically offset in parallel relationship to said side surfaces of said opposed cutting portions; and
F. the length dimension of said portions being a substantial multiple of the length dimension of said portion.

* * * * *